United States Patent
Gormish

(10) Patent No.: US 9,767,088 B2
(45) Date of Patent: Sep. 19, 2017

(54) STROKE AUTOCOMPLETION IN A FORM

(71) Applicant: Michael J. Gormish, Redwood City, CA (US)

(72) Inventor: Michael J. Gormish, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 875 days.

(21) Appl. No.: 13/789,592

(22) Filed: Mar. 7, 2013

(65) Prior Publication Data

US 2014/0258830 A1 Sep. 11, 2014

(51) Int. Cl.
*G06F 17/00* (2006.01)
*G06F 17/24* (2006.01)

(52) U.S. Cl.
CPC .......... *G06F 17/243* (2013.01); *G06F 17/242* (2013.01)

(58) Field of Classification Search
CPC ... G06F 17/243; G06F 17/3097; G06F 3/0237
See application file for complete search history.

(56) References Cited

U.S. PATENT DOCUMENTS

| | | | |
|---|---|---|---|
| 8,201,077 B2 | 6/2012 | Reddy et al. | |
| 2007/0089049 A1* | 4/2007 | Gormish | G06F 17/24 715/224 |
| 2008/0154824 A1* | 6/2008 | Weir | G06N 7/005 706/45 |
| 2010/0064030 A1* | 3/2010 | Miura | G06F 3/0237 709/219 |
| 2013/0275892 A1* | 10/2013 | Li | G06F 3/04817 715/762 |

* cited by examiner

*Primary Examiner* — Andrew McIntosh
(74) *Attorney, Agent, or Firm* — Patent Law Works LLP

(57) ABSTRACT

An electronic writing solution server includes a stroke autocompletion application that comprises an autocompletion processor. The autocompletion processor loads a blank form for a user, the form being associated with a list of auto completion target, retrieves a set of regions and a first form identifier (ID) included in the list of auto completion targets, receives information about the user, identifies a set of potential completion lists from a plurality of potential completion lists stored in a database based on the set of regions, the first form ID and the information about the user, retrieves at least one stroke from the set of potential completion lists for a region in the set of regions, ranks the at least one stroke and provides the at least one stroke to the user.

20 Claims, 9 Drawing Sheets

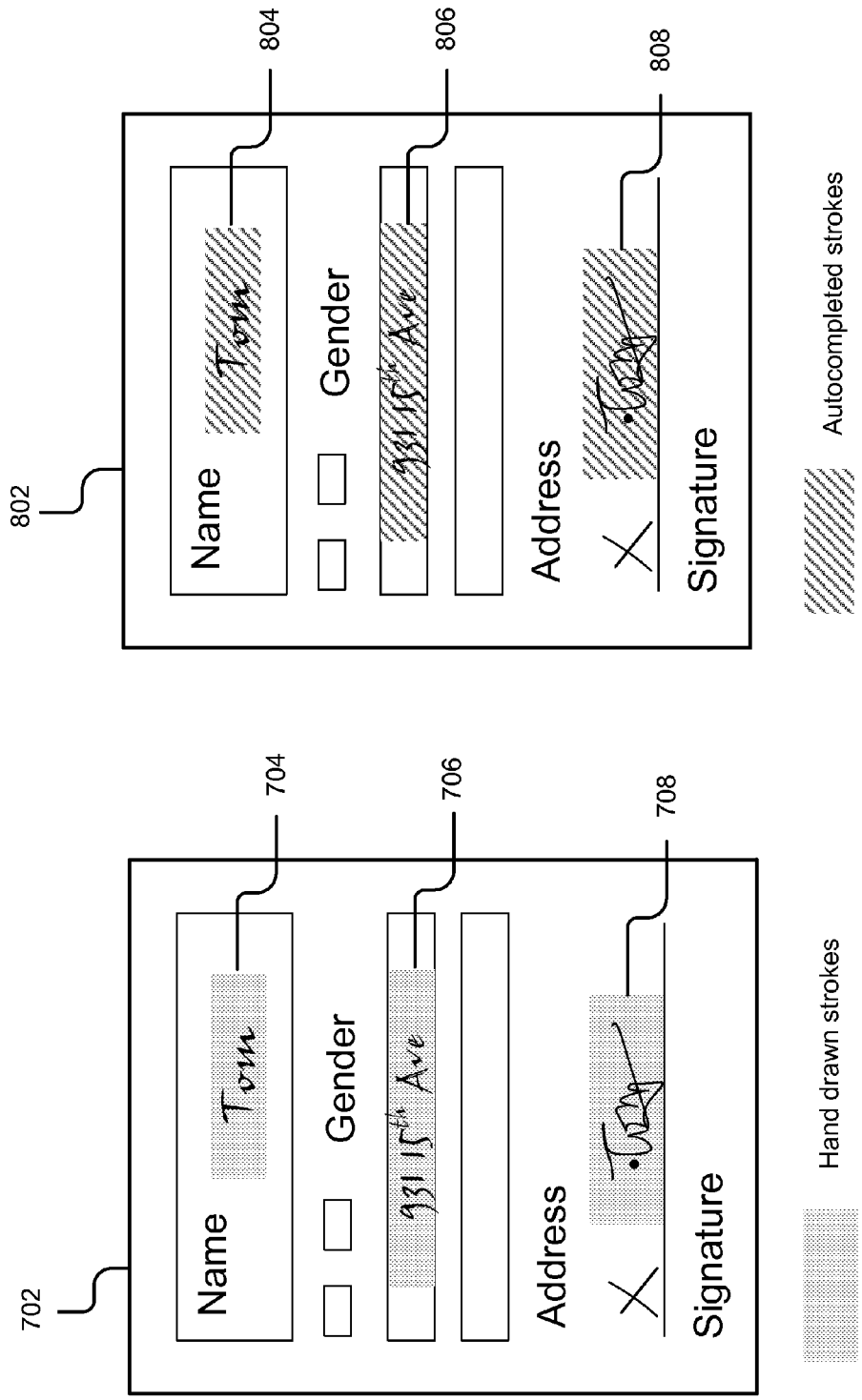

STROKE AUTOCOMPLETION IN A FORM

BACKGROUND OF THE INVENTION

1. Field of the Invention

The specification relates to processing of forms. In particular, the specification relates to automatically completing one or more regions in a form with stroke data.

2. Description of the Background Art

As the use of portable computing devices becomes common, many users input information into a form by using a stylus or a fingertip on portable computing devices. For example, a user inputs stroke data in a form with the stylus. Many users also fill out forms for a wide variety of purposes. Some of the forms may be similar or even the same as forms that were completed in the past. In one case, a user may fill out a form multiple times. In another case, a user may fill out a new form that has similar fields with a form that the user has already completed. In other cases, a user may fill out a general form that has been filled out by many other users. However, no matter how similar a current form is to a completed form, a user has to manually input information, especially stroke data, in every field of a form every time that the user fills the form. Filling out forms becomes complex and time-consuming.

Some attempts have been made to reduce the number of fields that the user has to fill in. For example, there are browser extensions for saving a user's personal information, such as name and credit card number to make filling out forms for purchasing objects easier. However, these applications only use symbolic information and they can only insert information into fields that have the same field name as a previous form, which reduces the usefulness of the applications.

SUMMARY OF THE INVENTION

The disclosure overcomes the deficiencies of the prior art with a system for automatically completing one or more regions in a form with stroke data. In one embodiment, an electronic writing solution server includes a stroke autocompletion application comprising an autocompletion processor. The autocompletion processor loads a blank form for a user, the form being associated with a list of auto completion targets, retrieves a set of regions and a first form identifier (ID) included in the list of auto completion targets, receives information about the user, identifies a set of potential completion lists from a plurality of potential completion lists stored in a database based on the set of regions, the first form ID and the information about the user, retrieves at least one stroke from the set of potential completion lists for a region in the set of regions, ranks the at least one stroke and provides the at least one stroke to the user.

Other aspects include corresponding methods, systems, apparatuses, and computer program products for these and other innovative aspects.

The system advantageously fills out one or more regions in a form with stroke data collected from forms completed in the past. As a result, the system can be used to quickly fill out a form without a user manually inputting information in every field of the form. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 7 is a graphic representation of an example form filled with hand drawn strokes.

FIG. 8 is a graphic representation of an example form filled with autocompleted strokes.

FIG. 9 is a graphic representation of an example form with regions autocompleted in response to receiving a user reaction.

FIG. 10 is a graphic representation of an example form with regions autocompleted based on a ranked list of auto-completed strokes.

DETAILED DESCRIPTION OF THE PREFERRED EMBODIMENTS

Figure 1:
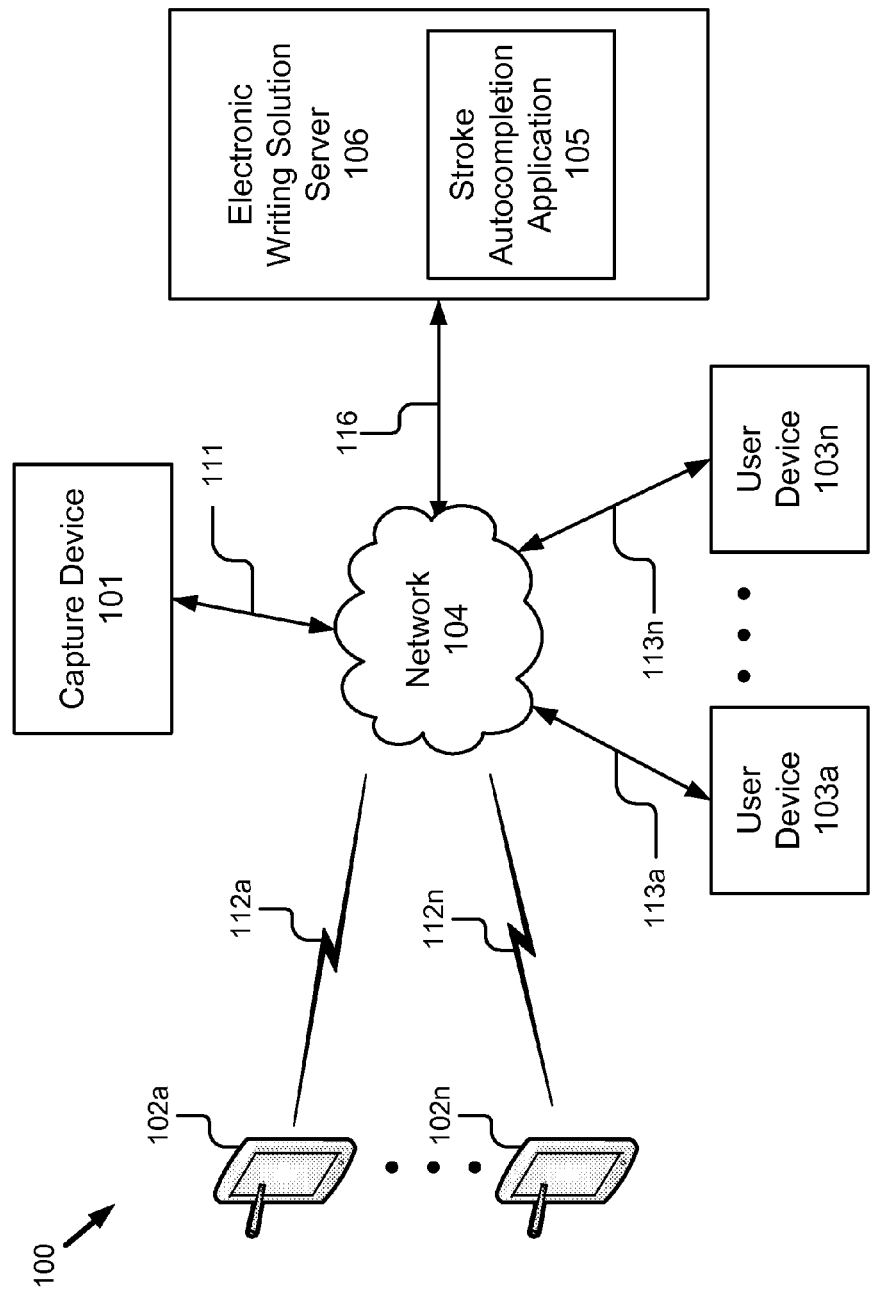
FIG. 1 is a high-level block diagram illustrating one embodiment of a system for automatically completing one or more regions in a form with stroke data.

A description of system and method for automatically completing one or more regions in a form with stroke data. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for automatically completing one or more regions in a form with stroke data according to one embodiment. The system 100 includes a stroke capture device 101, portable computing devices 102a-102n, user devices 103a-103n and an electronic writing solution server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103a-103n, the plurality of portable computing devices 102a-102n and the electronic writing solution server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive forms, add stroke annotation to the forms and send the annotated forms to the electronic writing solution server 106. A form is any electronic document that includes fields (e.g., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image that includes strokes. The strokes are written on the form image using a stylus or a fingertip by a user. The strokes are typically displayed on top of the image, just as if written by pen on paper. The computing pad usually receives the strokes as a sequence of points or segments along with location, timing and pressure information. The computing pad sends the form images in any image format known to persons of ordinary skill in the art, for example, a Scalable Vector Graphics (SVG) file format, which can contain both strokes and images. In one embodiment, the computing pad attaches the information associated with the strokes, for example, the location and timing information with the form images as metadata. The portable computing device 102 determines location information by using global positioning system (GPS) circuitry or accessing a database including media access control (MAC) addresses. In one embodiment, the strokes are saved in a format known to any person of ordinary skill in the art, including SVG or Ink Markup Language (InkML).

The capture device 101 is coupled to the network 104 via signal line 111. The capture device 101 is adapted to capture a form that includes strokes and send the strokes associated with the form to the electronic writing solution server 106. For example, the capture device 101 is a camera, a printer or a scanner that captures the image of a printed form. The capture device 101 sends the form and stroke information to the electronic writing solution server 106. In one embodiment, the capture device 101 captures a form identifier (ID) from the form that is used to identify the type of form that the user completed.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the electronic writing solution server 106. For example, the user device 103 sends a request to the electronic writing solution server 106 to load a form and receives the form from the electronic writing solution server 106. The user device 103 is accessed by users that have permission to access information from the electronic writing solution server 106, such as a creator of the form sent to portable computing devices 102 or an administrator of the electronic writing solution server 106.

The electronic writing solution server 106 is any computing device including a memory and a processor and is coupled to the network 104 via signal line 116. The electronic writing solution server 106 includes a stroke autocompletion application 105. The stroke autocompletion application 105 creates a list of auto completion targets associated with a user, creates potential completion lists associated with one or more users, and performs autocompletion for the form by matching the auto completion targets included in the list of auto completion targets with potential completions of strokes included in the potential completion lists. The stroke autocompletion application 105 is described in further detail below with reference to FIG. 2.

Electronic Writing Solution Server 106

Figure 2:
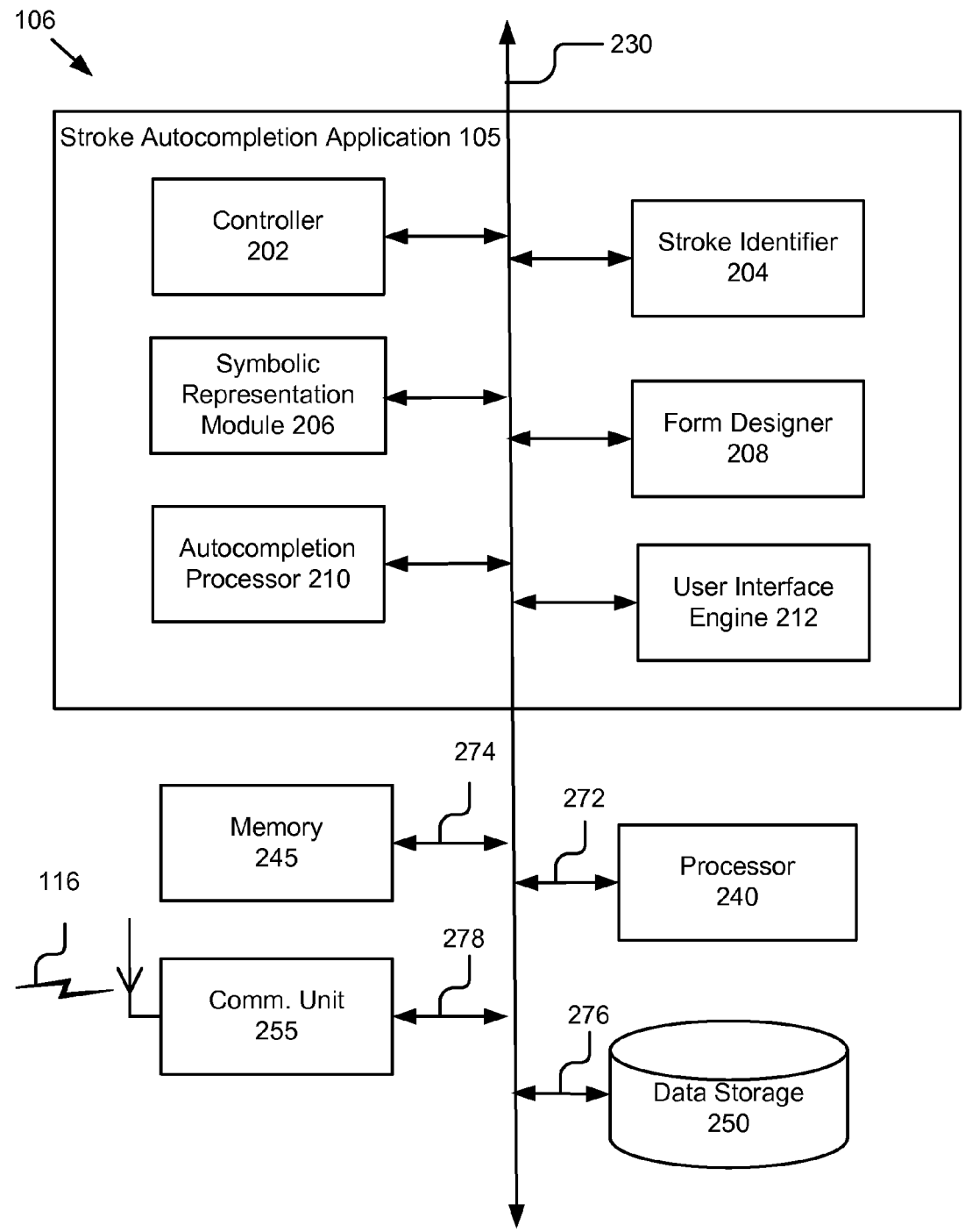
FIG. 2 is a block diagram illustrating one embodiment of a stroke autocompletion application in more detail.

Referring now to FIG. 2, the stroke autocompletion application 105 is shown in more detail. FIG. 2 is a block diagram of the electronic writing solution server 106 that includes a processor 240, a memory 245, a communication unit 255, data storage 250 and the stroke autocompletion application 105.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives user inputs such as stroke data for a form from the portable computing device 102 or the user device 103 and transmits the data to the stroke autocompletion application 105 for further processing. The communication unit 255 also transmits data to the user device 103, for example, a form with auto completed strokes. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores instructions and/or data used for automatically completing one or more regions in a form with stroke data. For example, the data storage 250 stores forms, stroke data or multimedia data inputted in the forms, symbolic data in the forms (e.g., converted from the stroke data inputted in the forms), a list of auto completion targets associated with a form and potential completion lists associated with one or more users. The data storage 250 is coupled to the bus 230 for communication with the other components via signal line 276.

In one embodiment, the stroke autocompletion application 105 includes a controller 202, a stroke identifier 204, a symbolic representation module 206, a form designer 208, an autocompletion processor 210 and a user interface engine 212.

The controller 202 is software and routines for receiving data via the communication unit 255, routing the data to appropriate components of the stroke autocompletion application 105 and transmitting responses from the components of the stroke autocompletion application 105 to the communication unit 255 for transmitting to the user device 103 and other components of the system 100. In one embodiment, the controller 202 is a set of instructions executable by the processor 240 to provide the functionality described below for managing data transfer between the components of the electronic writing solution server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the electronic writing solution server 106.

The stroke identifier 204 is software and routines for receiving stroke data associated with a form and identifying the position of the stroke data. In one embodiment, the stroke identifier is a set of instructions executable by the processor 240 to provide the functionality described below for receiving stroke data from the portable computing devices 102 or the stroke capture device 101 via the controller. In another embodiment, the stroke identifier 204 is stored in the memory 245 and is accessible and executable by the processor 240. In either embodiment, the stroke identifier 204 is adapted for cooperation and communication with the processor 240, the communication unit 255 and other components of the electronic writing solution server 106.

In one embodiment, the stroke identifier 204 identifies a stroke in a form image by identifying pixels in the form image that represent handwriting strokes. For example, the stroke identifier 204 identifies stroke pixels based on pixel intensities, pixel colors, etc. The stroke identifier 204 then determines a position (e.g., an x-y coordinate) of a stroke in the form. For example, the stroke identifier 204 uses metadata along with a form image to determine the position of each stroke in the form image. The stroke identifier 204 associates a stroke with a field in the form based on the position of the stroke. For example, the stroke identifier 204 identifies a field in a position of the form with a field identifier. Once a stroke in the position is identified, the stroke identifier 204 associates the stroke with the field using the field identifier.

In one embodiment, the stroke identifier 204 receives the completed form data including strokes (e.g. in InkML or other vector format) from the controller 202. The received form data also includes an unmarked blank form image (i.e., an image of the form without any strokes) as metadata. In another embodiment, the stroke identifier 204 generates completed form data for each completed form from an input completed form image by, for example, subtracting the input completed form image with the unmarked blank form image. The stroke identifier 204 then identifies the position of each stroke within the completed form data and compares it to the known location of the fields in the form.

Within this specification, stroke data is captured from forms as a sequence of points, line segments or curves, optionally including pressure, time and acceleration information associated with the strokes. For convenience, the strokes are frequently converted to images, but the images can include metadata about the strokes, like pressure or time data. The metadata could be included within the image or associated with the image in other ways. Stroke data and image data are frequently used interchangeably to refer to the data captured as strokes on the portable computing device 102.

The symbolic representation module 206 is software and routines for generating symbolic representations for stroke data in the form. In one embodiment, the symbolic representation module 206 is a set of instructions executable by the processor 240 to provide the functionality described below for generating symbolic representations. In another embodiment, the symbolic representation module 206 is stored in the memory 245 and is accessible and executable by the processor 240. In either embodiment, the symbolic representation module 206 is adapted for cooperation and communication with the processor 240, the communication unit 255 and other components of the electronic writing solution server 106.

The symbolic data includes machine encoded text such as Universal Character Set Transformation Format 8-bit (UTF-8). The symbolic data may have semantic meaning like the words "true" and "false" which have meaning beyond the characters used in the words. In one embodiment, the symbolic representation module 206 receives stroke data in a form and generates symbolic data corresponding to the stroke data using, for example, Optical Character Recognition (OCR), Optical Mark Recognition (OMR), intelligent character recognition (ICR), handwriting recognition, pattern recognition, etc. For example, the symbolic representation module 206 performs handwriting recognition to get the name "Amy" from the handwritten version of her name.

In another embodiment, the symbolic representation module 206 classifies stroke data in a form to generate symbolic data. In one embodiment, the symbolic representation module 206 receives stroke data in a form, determines similarities among the stroke data, classifies the stroke data into K (e.g., one, two, three, etc.) groups based on the similarities (e.g., by creating a hierarchical cluster), represents each group with a classification label and uses the classification label as the symbolic data. In one embodiment, the symbolic representation module 206 extracts an example stroke from each group of the K groups and converts the example stroke to a classification label. Although a group may contain different strokes, the symbolic representation module 206 selects a single example stroke and provides a single classification label to represent the group.

In one embodiment, the symbolic representation module 206 converts a portion of the stroke data included in a form to the symbolic data. Converting all of the stroke data would be computationally expensive and unnecessary since much of the data is legible without being converted. In one embodiment, the symbolic representation module 206 converts stroke data based on the user's specified preference for a specific field or fields, or even for all fields in the form to be displayed with symbolic data. In one embodiment, the symbolic representation module 206 stores the symbolic data in data storage 250. In another embodiment, the symbolic representation module 206 also transmits the symbolic data to the form designer 208.

The form designer 208 is software and routines for generating data used for stroke auto-completion in a form. In one embodiment, the form designer 208 is a set of instructions executable by the processor 240 to provide the functionality described below for generating data used for stroke auto-completion in the form. In another embodiment, the form designer 208 is stored in the memory 245 and is accessible and executable by the processor 240. In either embodiment, the form designer 208 is adapted for cooperation and communication with the processor 240, the communication unit 255 and other components of the electronic writing solution server 106.

The form designer 208 creates a list of auto completion targets associated with a form. The list of auto completion targets includes a set of regions in the form that accepts autocompleted strokes. The form designer 208 also creates potential completion lists associated with one or more users. The potential completion list stores the strokes that are used to auto complete the set of regions in the list of auto completion targets.

The form designer 208 receives a form that includes a set of fields. For example, the form designer 208 receives an employee expense reimbursement form that includes a field for receiving an employee's name, a field for receiving a date, one or more fields for receiving expense descriptions, one or more fields for receiving expense amounts, etc. Each field in the form is associated with a region (e.g., a bounding box) for receiving user inputs. A user can input a type of data in the region associated with a field. In one embodiment, the user input in a field includes text (e.g., stroke data) that represents a date, a word, a number, etc. In another embodiment, the user input in a field also includes multimedia data. The multimedia data includes one of video (e.g., an animation, a video from a camera), audio (e.g., a song from radio, a sound from a microphone), image (e.g., a photo, a slide) and a combination of the above types of data (e.g., a recording of a television broadcast that includes audio, video and caption text). The field could also include metadata (e.g., data from sensors such as a compass, an accelerometer, a global positioning system (GPS)).

In one embodiment, the form designer 208 receives a form associated with a form identifier (ID) identifying the form. In another embodiment, the form designer 208 assigns a form ID to the form. In one embodiment, the form designer 208 receives a form associated with a set of field labels identifying the set of fields in the form. In another embodiment, the form designer 208 determines a field label for each field in the form. In one embodiment, the form designer 208 assigns a field name to represent a field. For example, the form designer 208 labels a first field as a "Last Name" field and a second field as a "Date" field to receive handwritten names and dates respectively. In another embodiment, the form designer 208 automatically generates a label for a field. The form designer 208 analyzes an area around (e.g., to the left, right, top, bottom, etc.) a field in the form to identify a group of related pixels and assigns the group of related pixels as the label for the field. For example, the form designer 208 analyzes the top area of the strokes "Mike," identify a set of pixels in the top area, determines a word "First Name" based on the spacing between the set of connected pixels and uses the word "First Name" as the field label.

The form designer 208 creates a list of auto completion targets for the form. The list of auto completion targets includes the form ID identifying the form and a set of regions in the form that accepts auto completed strokes (e.g., completion targets). In one embodiment, the list of auto completion targets also includes field labels that are associated with the set of regions.

In one embodiment, the form designer 208 determines fields and associated regions in the form that receive stroke data, selects a set of regions from the regions for accepting auto completed strokes (e.g., autocompleting), and creates a list of auto completion targets to include the set of regions and the form ID that identifies the form. For example, the form designer 208 receives a form that includes ten fields. Among the ten fields, the form designer 208 determines that three fields receive stroke data in associated regions. The three fields are labeled as "Name," "Email Address" and "Signature." The form designer 208 includes the three regions associated with the three fields and the identifier of the form in a list of auto completion targets. When a user inputs information in the three fields, auto completed strokes will appear in the three regions and as a result, the form filling time for the user is reduced. In one embodiment, the form designer 208 also includes the field labels "Name," "Email Address" and "Signature" in the list of auto completion targets.

In one embodiment, the form designer 208 determines that regions receiving stroke data also receives auto completed strokes and includes the regions in a list of auto completion targets. In another embodiment, the form designer 208 determines that a subset of regions that receive stroke data also receive auto completed strokes and includes the subset of regions in a list of auto completion targets. For example, the form designer 208 determines that five fields in a form receive stroke data. The form designer 208 determines four out of five fields also receive auto completed strokes and includes the regions associated with the four fields in a list of auto completion targets. The form designer 208 determines a "Date" field that receives a handwritten date does not receive an auto completed date (e.g., because the auto completion of dates has limited use when a user fills out at most one form in a single day) and excludes the region associated with the "Date" field from the list of auto completion target.

The form designer 208 creates potential completion lists to include potential completions of strokes and other information. The potential completions include auto completed strokes that are used to auto complete the set of regions in the list of auto completion targets. The process of using the potential completions of strokes to auto complete the set of regions in the list of auto completion targets is described in more detail with reference to the autocompletion processor 210.

The form designer 208 creates potential completion lists for one or more users. Each potential completion list includes potential completions of strokes, a form ID and metadata. In one embodiment, the form designer 208 receives a form filled by a user via the controller 202, collects strokes inputted in a region of the form (e.g., past strokes) and stores the strokes as the auto completed strokes in the potential completion list. In this way, the form designer 208 creates a potential completion list for a particular user. For example, the form designer 208 collects a name written by John in the "Employee Name" field in an employee expense reimbursement form, and includes the handwritten "John" in the potential completion list for John. In another embodiment, the form designer 208 also creates a potential completion list for a particular device or a particular account by collecting and storing strokes inputted on the particular device or strokes inputted using the particular account.

The particular device or the particular account may be associated with a particular user. For example, the form designer 208 receives a first form filled out on a tablet and a second form filled out using an account "Rob." The form designer 208 collects a handwritten name from the first form and a signature from the second form, and creates a first potential completion list to include the handwritten name and a second potential completion list to include the signature. The first potential completion list is associated with Mary because Mary owns the tablet. The second potential completion list is associated with Robert because only Robert has access to the account associated with "Rob."

The form designer 208 also stores a form ID associated with the form in a potential completion list. For example, when including the handwritten "John" collected in an "Employee Name" field in an employee expense reimbursement form in a potential completion list for John, the form designer 208 also includes the form ID assigned to the employee expense reimbursement form in the list.

The form designer 208 further includes metadata related to the form, metadata related to the user who filled out the form and other metadata in a potential completion list. The metadata related to the form includes at least one of a field label and a date. When including strokes inputted in a region of the form in the potential completion list, the form designer 208 also includes the label of the field associated with the region in the potential completion list. In some cases, the form designer 208 also includes the date that the strokes were inputted in the region in the potential completion list. Continuing with the above example, the form designer 208 includes the label "Employee Name" and the date that John wrote down the name in the "Employee Name" field in the potential completion list for John.

In one embodiment, the metadata related to the user includes a login name used by the user in filling out the form. For example, if a user logged in a form filling system using a username "XYZ" and filled out a survey form, the form designer 208 includes the username "XYZ" along with the strokes collected in the survey form in a potential completion list. In another embodiment, the metadata related to the user includes other information such as a global positioning system (GPS) location or a media access control (MAC) address that identifies the location of the user when the user were filling out the form. For example, when a user filled out a form using a smart phone or a tablet, the form designer 208 can receive a GPS location from the smart phone or a MAC address from the tablet, and include the GPS location or the MAC address in the potential completion list.

In one embodiment, the other metadata includes statistical data about how strokes in the potential completion list have been used for autocompletion. For example, the form designer 208 stores the number of times that a stroke has been used for autocompletion and the number of times that the stroke has been rejected for autocompletion in the potential completion list. In another embodiment, the other metadata also includes stroke size, stroke color or other information (e.g., bluetooth pairing information) that is useful for stroke autocompletion.

The form designer 208 creates a list of auto completion targets associated with a form. The form designer 208 also creates potential completion lists associated with one or more users. Each user is associated with at least one potential completion list. The form designer 208 stores the list of auto completion targets associated with the form and the potential completion lists associated with the one or more users in the data storage 250. In another embodiment, the form designer 208 also stores completed forms collected from the one or more users, past strokes collected from the forms and other information (e.g., metadata) in the data storage 250.

The autocompletion processor 210 is software and routines for performing autocompletion in a form. In one embodiment, the autocompletion processor 210 is a set of instructions executable by the processor 240 to provide the functionality described below for performing autocompletion in a form. In another embodiment, the autocompletion processor 210 is stored in the memory 245 and is accessible and executable by the processor 240. In either embodiment, the autocompletion processor 210 is adapted for cooperation and communication with the processor 240, the communication unit 255 and other components of the electronic writing solution server 106.

The autocompletion processor 210 performs autocompletion of strokes on a form (e.g., automatically completes at least one region in the form). The autocompletion of the form is useful in many cases. In one case, when a user fills out a form multiple times, the autocompletion processor 210 communicates with the stroke identifier 204 and the form designer 208 to collect a stroke from the form that the user first filled out and autocomplete the same form using the collected stroke when the user fills out the form at other times. For example, when a patient returns to the doctor's office, the autocompletion processor 210 autocompletes the same form for the user and the form allows the user to change fields where the information is outdated. In another case, when a user fills out different forms that have similar fields, the autocompletion processor 210 communicates with the stroke identifier 204 and the form designer 208 to collect a stroke from a first field in a first form and autocomplete a second field in a second form using the collected stroke if the first field and the second field are similar. For example, the autocompletion processor 210 communicates with the stroke identifier 204 and the form designer 208 to collect John's handwritten email address from the "Email Address" field in a survey form and uses this handwritten email address in the "Email" field in a registration form filled out by John.

In yet another case, when multiple users fill out a single form, the autocompletion processor 210 communicates with other components of the stroke autocompletion application 105 (e.g., 204, 206 and 208) to collect a stroke from the form filled out by a user, convert the stroke to a symbolic representation, and use the symbolic representation to autocomplete the form filled out by other users. For example, if Alice filled out an order form to place an order for a Toyota car and Ryan is going to place an order for another Toyota car using the same order form, the autocompletion processor 210 communicates with other components of the stroke autocompletion application 105 (e.g., 204, 206 and 208) to collect strokes of "Toyota" from Alice's order form, convert Alice's handwritten "Toyota" to a symbolic representation, and use the symbolic representation of "Toyota" to autocomplete the order form placed by Ryan. In yet another case, when multiple users fill out multiple forms, the autocompletion processor 210 communicates with other components of the stroke autocompletion application 105 (e.g., 204, 206 and 208) to collect a stroke from a first form filled out by a first user, convert the stroke to a symbolic representation, and use the symbolic representation to autocomplete other forms filled out by other users. For example, the autocompletion processor 210 communicates with other components of the stroke autocompletion application 105 (e.g., 204, 206 and 208) to collect strokes of "Toyota" from Alice's order form, convert the strokes to a symbolic representation, and use the symbolic representation of "Toyota" to autocomplete the "Car Make" field in an accident report form filled out by Alex.

The autocompletion processor 210 performs autocompletion of strokes on a form by matching the completion targets included in a list of auto completion targets (e.g., a set of regions that accepts auto completed strokes) with potential completions of strokes included in a set of potential completion lists based on information about a form, a user and metadata (e.g., field labels).

When a user sends a request for a form (e.g., a blank form), the autocompletion processor 210 loads the form for the user from a database. In one embodiment, the database is the data storage 250. The form is associated with a list of auto completion targets created by the form designer 208. The autocompletion processor 210 retrieves the list of auto completion targets associated with the form from the database. The list of auto completion targets includes a form ID identifying the form and a set of regions in the form that accepts auto completed strokes. In one embodiment, the list of auto completion targets also includes field labels that are associated with the set of regions. The autocompletion processor 210 also receives information about the user, for example, a username that was used by the user to send the request for the form, a GPS location of a phone held by the user when the user was sending the request for the form or a MAC address of a wireless access point in range of the tablet that the user was using to send the request for the form, etc.

Based on the set of regions, the form ID and the information about the user, the autocompletion processor 210 identifies a set of potential completion lists from a plurality of potential completion lists stored in the database. A potential completion list includes potential completions of strokes, a form ID and metadata. The metadata includes metadata related to the form (e.g., a field label, a date), metadata related to the user who filled out the form (e.g., a login name, a GPS location) and other metadata (e.g., statistical data about how strokes in the potential completion list have been used as completion targets). The autocompletion processor 210 uses the potential completions of strokes in the set of potential completion lists to automatically complete the set of regions in the form.

In one embodiment, the autocompletion processor 210 receives the form ID in the list of auto completion targets associated with the form, determines the user from the information about the user, and identifies a set of potential completion lists based on the determined user and the form ID. The set of potential completion lists is associated with the user and includes the same form ID as in the list of auto completion targets. For example, the autocompletion processor 210 receives a MAC address that is used to send the request for a form and determines that the MAC address is assigned to a tablet owned by Julie. The autocompletion processor 210 determines that Julie sent the request for the form. The form ID is included in the list of auto completion targets associated with the form. The autocompletion processor 210 retrieves a potential completion list from the database. The potential completion list is associated with Julie and includes the form ID. In this embodiment, the autocompletion processor 210 can use the retrieved potential completion lists to autocomplete the same form filled out by a user at a different time.

In another embodiment, the autocompletion processor 210 determines the user from the information about the user and identifies potential completion lists that are associated with the user from the plurality of potential completion lists. The autocompletion processor 210 also receives the list of auto completion targets that includes the form ID, the set of regions and field labels that are associated with the set of regions. The autocompletion processor 210 identifies, from the potential completion lists that are associated with the user, a set of potential completion lists that includes different form IDs but at least one same field label as in the list of auto completion targets. For example, the autocompletion processor 210 receives a request for a form from Jenny. The form includes a "Year" field and an "Address" field. The list of auto completion targets associated with the form includes the form ID, the regions for the two fields and the two field labels. The autocompletion processor 210 identifies that at least one potential completion list associated with Jenny includes a different form ID but has a same "Address" field. The autocompletion processor 210 retrieves the at least one potential completion list from the database. In this embodiment, the autocompletion processor 210 can use the retrieved potential completion lists to autocomplete a different form filled out by a user.

In yet another embodiment, the autocompletion processor 210 receives the form ID, the set of regions and field labels that are associated with the set of regions in the list of auto completion targets and identifies a set of potential completion lists. The set of potential completion lists includes the same form ID as in the list of auto completion targets and symbolic representations of strokes in at least one of the set of regions in the list of auto completion targets. The set of potential completion lists is associated with multiple users. For example, the autocompletion processor 210 determines that the list of auto completion targets associated with a form includes a first form ID and a region associated with a field "Car Make." The autocompletion processor 210 identifies a set of potential completion lists that includes the first form ID and symbolic representations of strokes in the "Car Make" field (e.g., printed "Honda," printed "Toyota"). The set of potential completion lists is associated with multiple users. For instance, the printed "Honda" and "Toyota" are converted from past strokes inputted by a first user and a second user respectively. The set of potential completion lists therefore includes at least a first list associated with the first user and a second list associated with the second user. In this embodiment, the autocompletion processor 210 can use the retrieved potential completion lists to autocomplete the same form filled out by multiple users.

In yet another embodiment, the autocompletion processor 210 receives the set of regions and field labels that are associated with the set of regions in the list of auto completion targets, and identifies a set of potential completion lists that includes symbolic representations of strokes in at least one of the set of regions in the list of auto completion targets. The set of potential completion lists is associated with multiple users. For example, the autocompletion processor 210 determines that the list of auto completion targets associated with a form includes three regions. The three regions are associated three fields including a "Zip Code" field, an "Address" field and a "Nationality" field. The autocompletion processor 210 identifies two potential completion lists. The first potential completions list includes the symbolic representations of strokes in the first field (e.g., printed zip code in the "Zip Code" field). The second potential completion list includes the symbolic representations of strokes in the third field (e.g., printed nationality information in the "Nationality" field). The set of potential completion list is associated with multiple users. In this embodiment, the autocompletion processor 210 can use the retrieved potential completion lists to autocomplete different forms filled out by different users.

In yet another embodiment, the autocompletion processor 210 further identifies a set of potential completion lists based on metadata. In one example, the autocompletion processor 210 identifies a set of potential completion lists associated with a user if the user sent the request for a form using a pen with a particular identifier, a phone with a particular MAC address or bluetooth pairing being in close proximity. In this way, auto completion information is protected. In another example, the autocompletion processor 210 identifies a set of potential completion lists including strokes that have been used as completion targets more than ten times.

Once the set of potential completion lists is identified, the autocompletion processor 210 retrieves at least one stroke from the set of potential completion lists. The autocompletion processor 210 uses the at least one stroke to autocomplete a region in the form. The region is one of the set of regions included in the list of auto completion targets. For example, the autocompletion processor 210 retrieves John's name from the set of potential completion lists and uses the name to complete a "Name" field in a form. In this way, the autocompletion processor 210 provides past strokes to autocomplete a field in a new form and saves the time for a user to fill out the new form.

In one embodiment, the autocompletion processor 210 ranks the strokes for autocompleting a region in the form. In one embodiment, the autocompletion processor 210 ranks the strokes based on one or more predetermined rules. In another embodiment, the autocompletion processor 210 receives preferences from a user and ranks the at least one stroke based on the user preferences. The one or more predetermined rules or the user preferences include, but are not limited to, preferring strokes on the same form, preferring strokes that have been used in previous successful completions, preferring strokes with the same field label, preferring strokes used with other autocompleted strokes, etc. For example, the autocompletion processor 210 retrieves signatures "J. W. Smith" and "J. Smith" from two potential completion lists, and ranks the two signatures to autocomplete a "Signature" field in a registration form based on user preferences. The first potential completion list includes the signature "J. W. Smith" along with the form ID that identifies the registration form. The second potential completion list includes the signature "J. Smith" along with a form ID identifying a survey form and a field label "Signature." If the user prefers strokes on the same form, the autocompletion processor 210 ranks the signature "J. W. Smith" higher than "J. Smith." If the user prefers strokes with the same field label, the autocompletion processor 210 ranks the signature "J. Smith" higher than "J. W. Smith." If the user prefers strokes that have been used in previous successful completions, and both signatures "J. W. Smith" and "J. Smith" were not used in any previous successful completions, the autocompletion processors 208 receives a second preference from the user to rank the signatures.

In another embodiment, the autocompletion processor 210 also adjusts the at least one stroke to autocomplete the region in the form. In one embodiment, the autocompletion processor 210 scales the at least one stroke to fit in the region in the form. In another embodiment, the autocompletion processor 210 changes the color of the at least one stroke to fit in the region in the form. Persons of ordinary skill in the art will recognize that other adjustments of the at least one stroke (e.g., rotation) are possible.

The autocompletion processor 210 provides the at least one stroke to the user. In one embodiment, the autocompletion processor 210 communicates with the user interface engine 212 to generate graphical data for displaying the at least one stroke to the user. For example, the autocompletion processor 210 instructs the user interface engine 212 to display a list in the middle of the region associated with the "signature" field. The list includes two signatures "J. W. Smith" and "J. Smith." The highest-ranked signature "J. W. Smith" is on the top of the list.

In one embodiment, the autocompletion processor 210 receives a user reaction for the at least one stroke provided to the user. For example, the autocompletion processor 210 instructs the user interface engine 212 to present a menu to the user. The user reacts by selecting an option from the menu. In one embodiment, the user reaction includes at least one of an acceptance, a rejection and an erasure. When the user accepts one of the strokes, the autocompletion for the region is completed. When the user erases at least one stroke, the user inputs a new stroke in the region. When the user rejects at least one stroke, the autocompletion processor 210 or the user can provide a new stroke in the region. By reacting to the at least one stroke in the region, the user can choose a preferred stroke or correct a stroke for future autocompletion.

In one embodiment, the autocompletion processor 210 updates the set of potential completion lists once the autocompletion of the region in the form is completed. In one embodiment, the autocompletion processor 210 updates the metadata included in the set of potential completion lists. In one example, the autocompletion processor 210 increases the number of times that a stroke has been used as a completion in response to the user accepting the stroke for autocompleting a region. In another example, the autocompletion processor 210 modifies the stroke size or color based on the adjustments of the stroke in autocompleting the region. The autocompletion processor 210 stores the modified metadata in one or more potential completion lists. In one embodiment, the autocompletion processor 210 stores the updated potential completion lists in the data storage 250.

In one embodiment, in addition to autocompleting a form with stroke data, the autocompletion processor 210 also communicates with the other components of the stroke autocompletion application 105 to automatically add multimedia data (e.g., camera images, audio streams, videos) to a form that accepts multimedia data. The multimedia data is retrieved, for example, from a camera roll on the portable computing device 102 and organized according to the most recently captured images.

In one embodiment, when auto completing one or more regions with images, the autocompletion processor 210 loads the images and instructs the user interface engine 212 to display them as being partially grayed out. The autocompletion processor 210 receives a user reaction either confirming that the image can be used again or showing that the image should be retaken. In another embodiment, the autocompletion processor 210 uses recently captured images to autocomplete a form. The autocompletion processor 210 can preload the recently captured images into the form when loading the form. In one embodiment, the autocompletion processor 210 uses coarse grain classification algorithms to position the images appropriately, for example, to place automatically loaded images in the right fields in the form. For example, the autocompletion processor 210 uses a classification algorithm to associate the most recent photo of a person a first field. The first field receives an image of a person. The autocompletion processor 210 also associates the most recent image of a card with a second field. The second field receives the person's insurance ID card.

The user interface engine 212 is software and routines for generating graphical data for displaying a user interface. In one embodiment, the user interface engine 212 is a set of instructions executable by the processor 240 to provide the functionality described below for generating the user interface. In another embodiment, the user interface engine 212 is stored in the memory 245 and is accessible and executable by the processor 240. In either embodiment, the user interface engine 212 is adapted for cooperation and communication with the processor 240, the communication unit 255 and other components of the electronic writing solution server 106.

In one embodiment, the user interface engine 212 generates graphical data for displaying a form to a user. In another embodiment, the user interface engine 212 generates graphical data for receiving user inputs to a form, for example, stroke data or multimedia data. In yet another embodiment, the user interface engine 212 generates graphical data for presenting autocompleted strokes to a user. For example, the autocompletion processor 210 instructs the user interface engine 212 to display a ranked list of autocompleted strokes to a user. In yet another embodiment, the user interface engine 212 generates graphical data for receiving a user reaction for auto completed strokes. For example, the autocompletion processor 210 instructs the user interface engine 212 to generate a drop-down menu to receive the user' selection for accepting, rejecting or erasing an auto completed stroke. In yet another embodiment, the user interface engine 212 allows the user to choose between a list of autocompletes strokes or symbolic representations for each field or all fields in the form.

Methods

Figure 3:
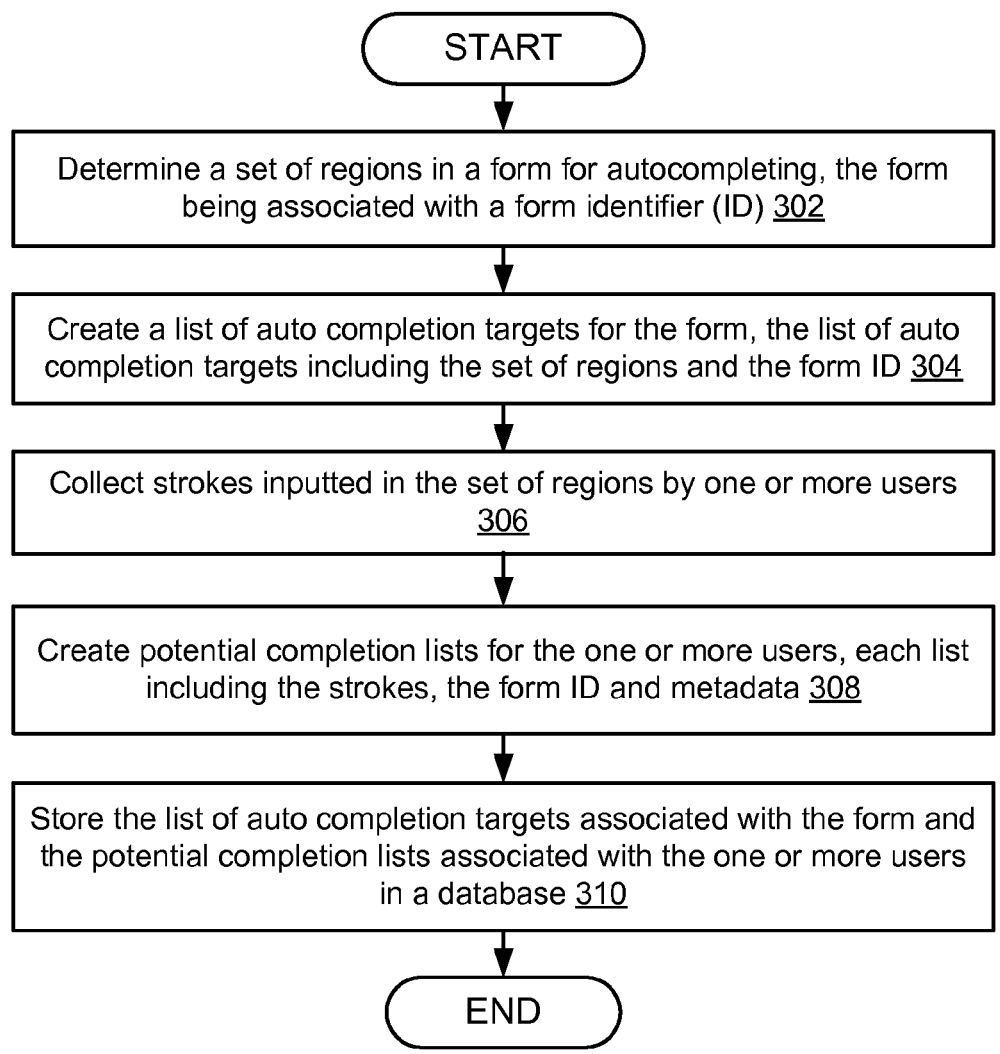
FIG. 3 is a flow diagram of one embodiment of a method for generating data used for stroke auto-completion in a form.

Referring now to FIGS. 3 and 4, the methods of the invention will be described in more detail. FIG. 3 is a flow diagram 300 that illustrates one embodiment of a method for generating data used for stroke auto-completion in a form. The stroke autocompletion application 105 includes a form designer 208. The form designer 208 determines 302 a set of regions in a form for autocompleting, the form being associated with a form identifier (ID). The form designer 208 creates 304 a list of auto completion targets for the form, the list of auto completion targets including the set of regions and the form ID. In one embodiment, the form designer 208 determines that regions receiving stroke data also receives auto completed strokes and includes the regions in a list of auto completion targets. In another embodiment, the form designer 208 determines that a subset of regions that receive stroke data also receives auto completed strokes and includes the subset of regions in a list of auto completion targets.

The form designer 208 collects 306 strokes inputted in the set of regions by one or more users. The form designer 208 creates 308 potential completion lists for the one or more users, the potential completion list including the strokes, the form ID and metadata. In one embodiment, the form designer 208 receives a form filled out by a user via the controller 202, collects strokes inputted in a region of the form (e.g., past strokes) and stores the strokes as the auto completed strokes in the potential completion list.

The form designer 208 also includes metadata related to the form, metadata related to the user who filled out the form and other metadata in a potential completion list. The metadata related to the form includes at least one of a field label and a date. When including strokes inputted in a region of the form in the potential completion list, the form designer 208 also includes the label of the field associated with the region in the potential completion list. In some cases, the form designer 208 also includes the date that the strokes were inputted in the region in the potential completion list.

In one embodiment, the metadata related to the user includes a login name used by the user in filling out the form. In another embodiment, the metadata related to the user includes other information such as a global positioning system (GPS) location or a media access control (MAC) address that identifies the location of the user when the user was filling out the form.

In one embodiment, the metadata includes statistical data about how strokes in the potential completion list have been used as completion targets. For example, the form designer 208 stores the number of times that a stroke has been used as a completion target and the number of times that the stroke has been rejected as a completion target in the potential completion list. In another embodiment, the other metadata also includes stroke size, stroke color or other information (e.g., bluetooth pairing information) that is useful for stroke autocompletion.

The form designer 208 stores 310 the list of auto completion targets associated with the form and the potential completion lists associated with the one or more user in a database.

Figure 4A:
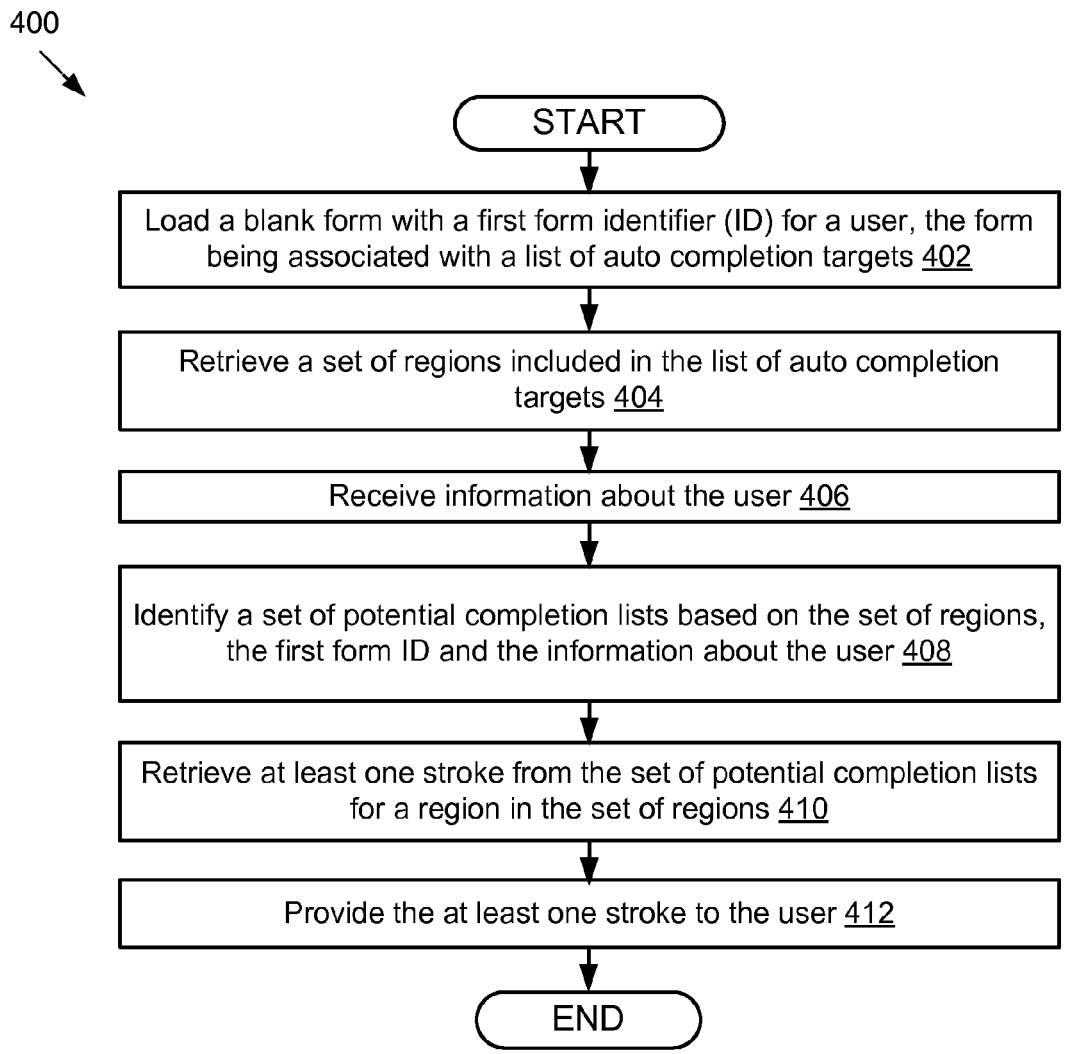
FIG. 4A is a flow diagram of one embodiment of a method for performing autocompletion on a form.

FIG. 4A is a flow diagram 400 that illustrates one embodiment of a method for performing autocompletion on a form. The stroke autocompletion application 105 includes an autocompletion processor 210. The autocompletion processor 210 loads 402 a blank form with a first form identifier (ID) for a user, the form being associated with a list of auto completion targets. The autocompletion processor 210 retrieves 404 a set of regions included in the list of auto completion targets. In one embodiment, the autocompletion processor 210 also retrieves field labels that are associated with the set of regions from the list of auto completion targets. The autocompletion processor 210 receives 406 information about the user, for example, a username that was used by the user to send the request for the form, a GPS location of a phone held by the user when the user was sending the request for the form or a MAC address of a tablet that the user was using to send the request for the form, etc.

The autocompletion processor 210 identifies 408 a set of potential completion lists based on the set of regions, the first form ID and the information about the user.

In one embodiment, the autocompletion processor 210 receives the form ID in the list of auto completion targets associated with the form, determines the user from the information about the user, and identifies a set of potential completion lists based on the determined user and the form ID. The set of potential completion lists is associated with the user and includes the same form ID as in the list of auto completion targets. In this embodiment, the autocompletion processor 210 can use the retrieved potential completion lists to autocomplete the same form filled out by a user at a different time.

In another embodiment, the autocompletion processor 210 determines the user from the information about the user and identifies potential completion lists that are associated with the user from the plurality of potential completion lists. The autocompletion processor 210 also receives the list of auto completion targets that includes the form ID, the set of regions and field labels that are associated with the set of regions. The autocompletion processor 210 identifies, from the potential completion lists that are associated with the user, a set of potential completion lists that includes different form IDs but at least one same field label as in the list of auto completion targets. In this embodiment, the autocompletion processor 210 can use the retrieved potential completion lists to autocomplete a different form filled out by a user.

In yet another embodiment, the autocompletion processor 210 receives the form ID, the set of regions and field labels that are associated with the set of regions in the list of auto completion targets and identifies a set of potential completion lists. The set of potential completion lists includes the same form ID as in the list of auto completion targets and symbolic representations of strokes in at least one of the set of regions in the list of auto completion targets. The set of potential completion lists is associated with multiple users. In this embodiment, the autocompletion processor 210 can use the retrieved potential completion lists to autocomplete the same form filled out by multiple users.

In yet another embodiment, the autocompletion processor 210 receives the set of regions and field labels that are associated with the set of regions in the list of auto completion targets, and identifies a set of potential completion lists that includes symbolic representations of strokes in at least one of the set of regions in the list of auto completion targets. The set of potential completion lists is associated with multiple users. In this embodiment, the autocompletion processor 210 can use the retrieved potential completion lists to autocomplete different forms filled out by different users.

In yet another embodiment, the autocompletion processor 210 further identifies a set of potential completion lists based on metadata. For example, the autocompletion processor 210 identifies a set of potential completion lists associated with a user if the user sent the request for a form using a pen with a particular identifier, a phone with a particular MAC address or bluetooth pairing being in close proximity.

The autocompletion processor 210 retrieves 410 at least one stroke from the set of potential completion lists for a region in the set of regions. The autocompletion processor 210 provides 412 the at least one stroke to the user via the communication unit.

Figure 4B:
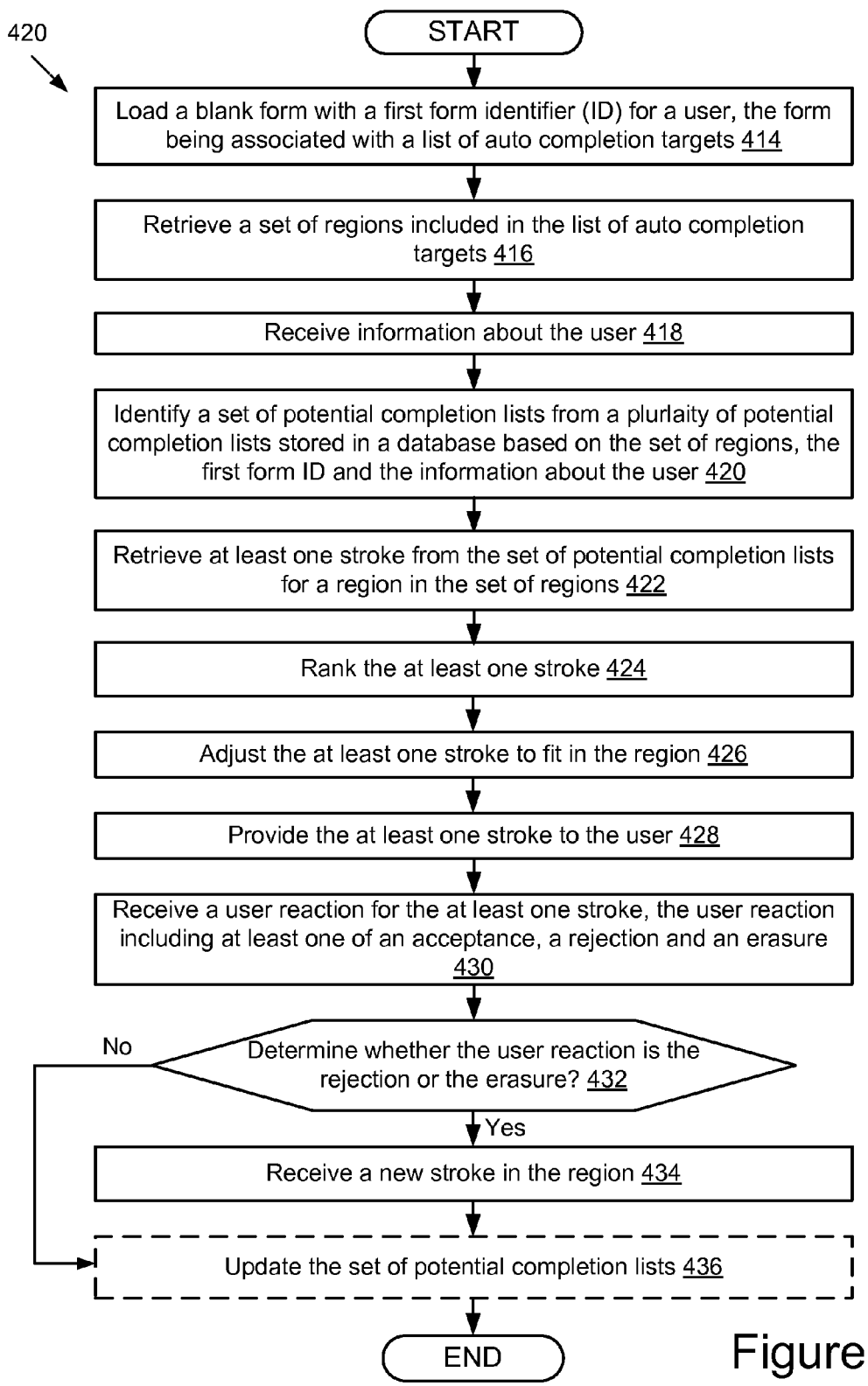
FIG. 4B is a flow diagram of another embodiment of a method for performing autocompletion on a form.

FIG. 4B is a flow diagram 420 that illustrates one embodiment of a method for performing autocompletion on a form. The autocompletion processor 210 loads 414 a blank form with a first form identifier (ID) for a user, the form being associated with a list of auto completion targets. The autocompletion processor 210 retrieves 416 a set of regions included in the list of auto completion targets. The autocompletion processor 210 receives 418 information about the user. The autocompletion processor 210 identifies 420 a set of potential completion lists from a plurality of potential completion lists stored in a database based on the set of regions, the first form ID and the information about the user. The autocompletion processor 210 retrieves 422 at least one stroke from the set of potential completion lists for a region in the set of regions.

The autocompletion processor 210 ranks 424 the at least one stroke. In one embodiment, the autocompletion processor 210 ranks the at least one stroke based on one or more predetermined rules. In another embodiment, the autocompletion processor 210 receives preferences from a user and ranks the at least one stroke based on the user preferences. The one or more predetermined rules or the user preferences include, but are not limited to, preferring strokes on the same form, preferring strokes that have been used in previous successful completions, preferring strokes with the same field label, preferring strokes used with other autocompleted strokes, etc.

The autocompletion processor 210 adjusts 426 the at least one stroke to fit in the region. For example, the autocompletion processor 210 scales the at least one stroke or changes the color of the at least one stroke. The autocompletion processor 210 provides 428 the at least one stroke to the user. In one embodiment, the autocompletion processor 210 communicates with the user interface engine 212 to generate graphical data for displaying the at least one stroke to the user.

The autocompletion processor 210 receives 430 a user reaction for the at least one stroke, the user reaction including at least one of an acceptance, a rejection and an erasure. For example, the autocompletion processor 210 instructs the user interface engine 212 to present a menu to the user. The user reacts by selecting an option from the menu. The autocompletion processor 210 determines 432 whether the user reaction is the rejection or the erasure. In response to determining that the user reaction is the acceptance, rejection or the erasure, the autocompletion processor 210 receives 434 a new stroke in the region. Otherwise, the method 500 goes to the step 424.

The autocompletion processor 210 updates 436 the set of potential completion lists. In one embodiment, the autocompletion processor 210 updates the metadata included in the set of potential completion lists. The step 436 depicted with a dash line is optional.

Example Graphic Representations

Figure 5:
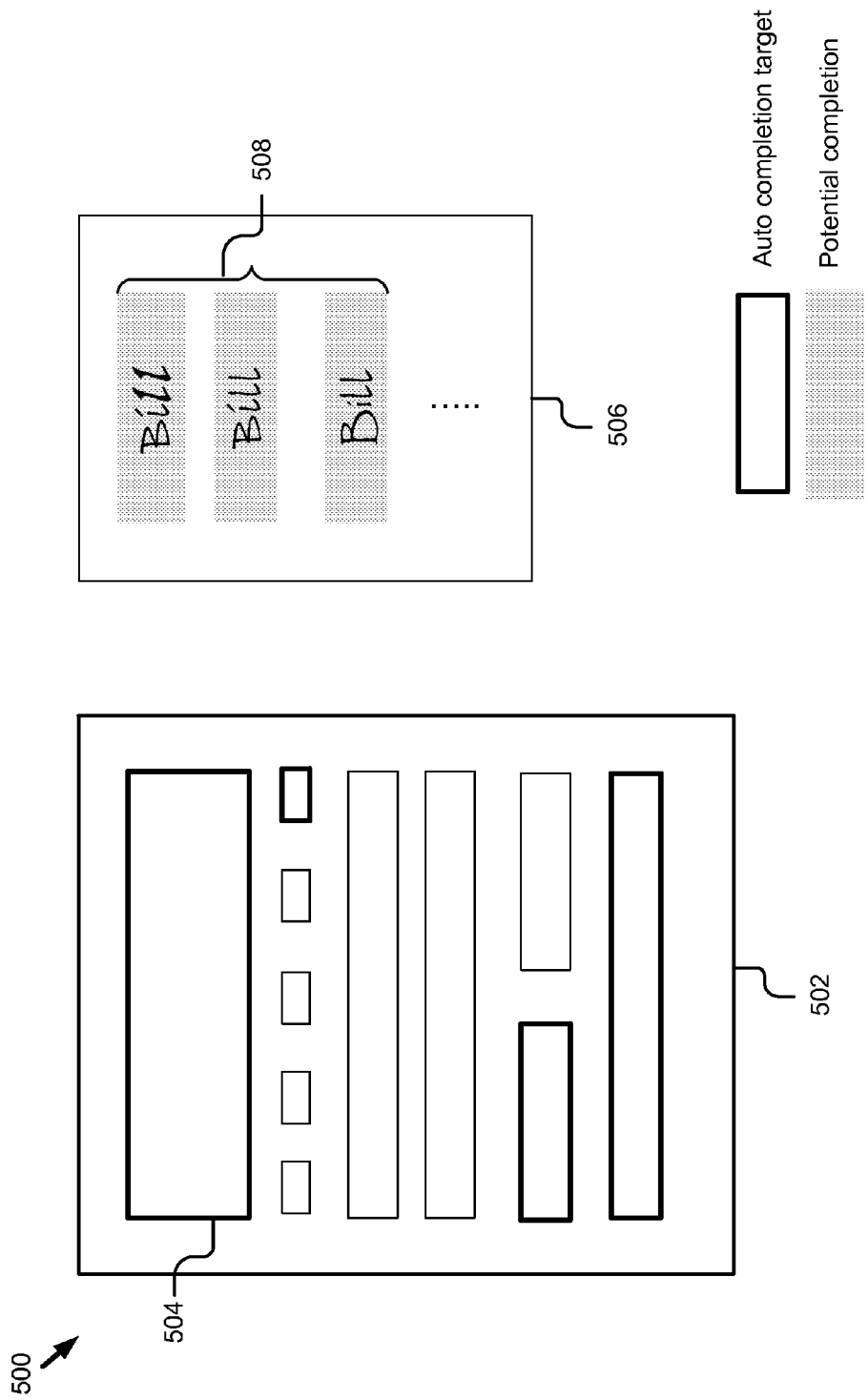
FIG. 5 is a graphic representation of example auto completion targets and example potential completions.

FIG. 5 is a graphic representation 500 of example auto completion targets and example potential completions. The form 502 includes a set of regions. The regions in a thick line (e.g., the region 504) are used for autocompletion targets. The form designer 206 creates a list of autocompletion targets to include the auto completion targets. The form designer 206 also creates potential completion lists associated with one or more users. A potential completion list includes potential strokes that can be used to autocomplete the auto completion targets (e.g., potential completions). The list 506 is a potential completion list that includes at least three potential strokes in gray shade. The potential strokes 508 of handwritten "Bill" can be used to autocomplete a region in the form 502, for example, a name region.

Figure 6:
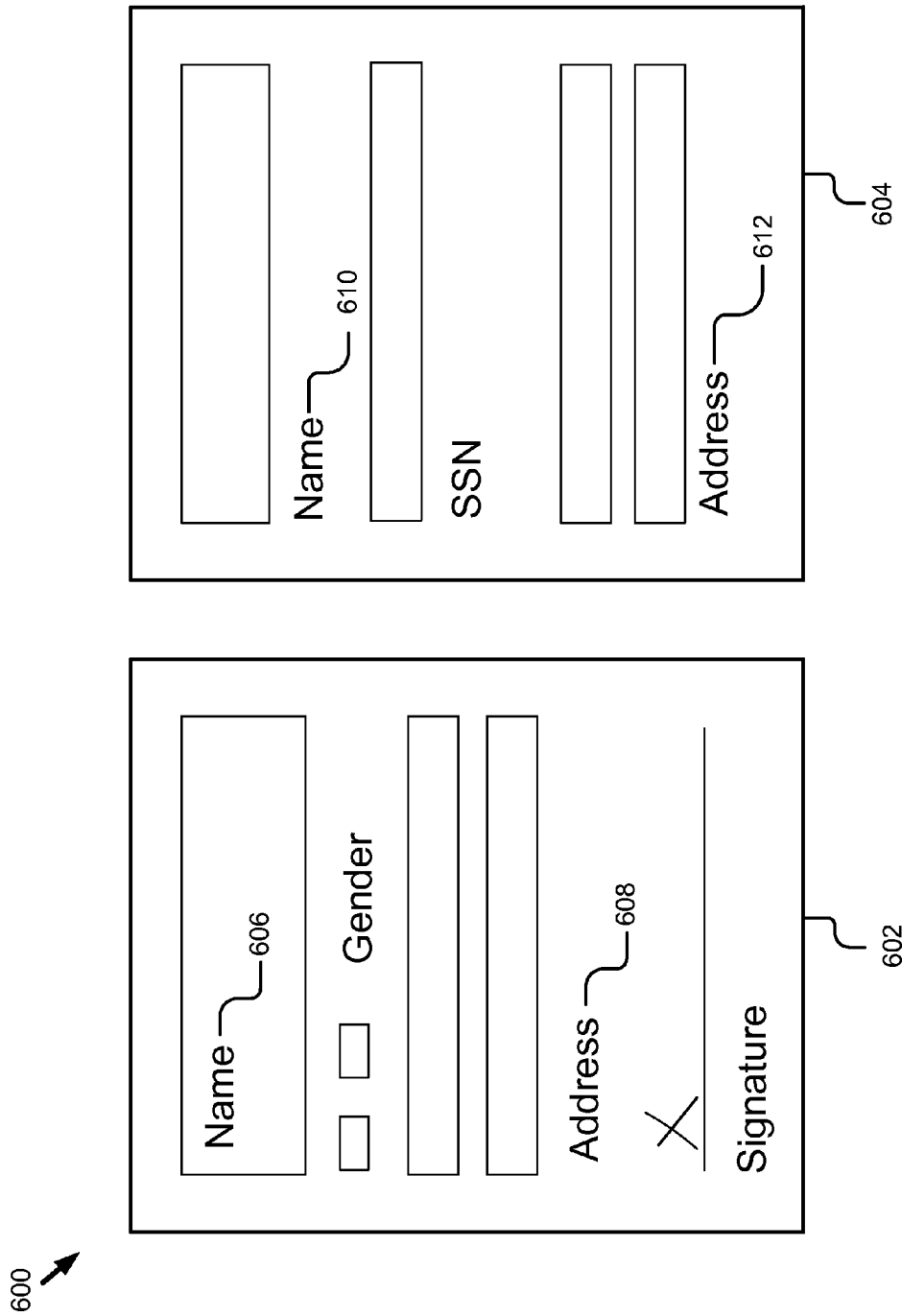
FIG. 6 is a graphic representation of two forms with similar fields.

FIG. 6 is a graphic representation 600 that includes two example forms 602 and 604. The first form 602 includes a "Name" field 606 and an "Address" field 608. The second form 604 also includes a "Name" field 610 and an "Address" field 612 in different locations. The forms 602 and 604 contain similar name information and address information. The autocompletion processor 210 can communicate with the stroke identifier 204 and the form designer 206 to collect strokes inputted in regions associated with the fields 606 and 608 and use the collected strokes to autocomplete regions associated with the fields 610 and 612, or vice versa. The autocompletion of strokes in the "Name" field and the "Address" field in the form 602 or 604 expedites the completion of the form.

FIG. 7 is a graphic representation of an example form 702 filled with original strokes. The form 702 includes original strokes 704, 706 and 708. The form designer 206 can communicate with the stroke identifier 204 to include the original strokes 704, 706 and 708 in a potential completion list as potential completion targets. Both the original strokes and potential completion targets are depicted in gray.

FIG. 8 is a graphic representation of an example form 802 filled with autocompleted strokes. The form 802 includes autocompleted strokes 804, 806 and 808 depicted with stripes. For example, the autocompletion processor 210 retrieves a potential completion list that includes potential completion targets collected based on the original strokes 704, 706 and 708, and autocompletes the corresponding regions in the form 802 with the potential completions 704, 706 and 708 in the retrieved potential completion list.

Figures 9, 10:
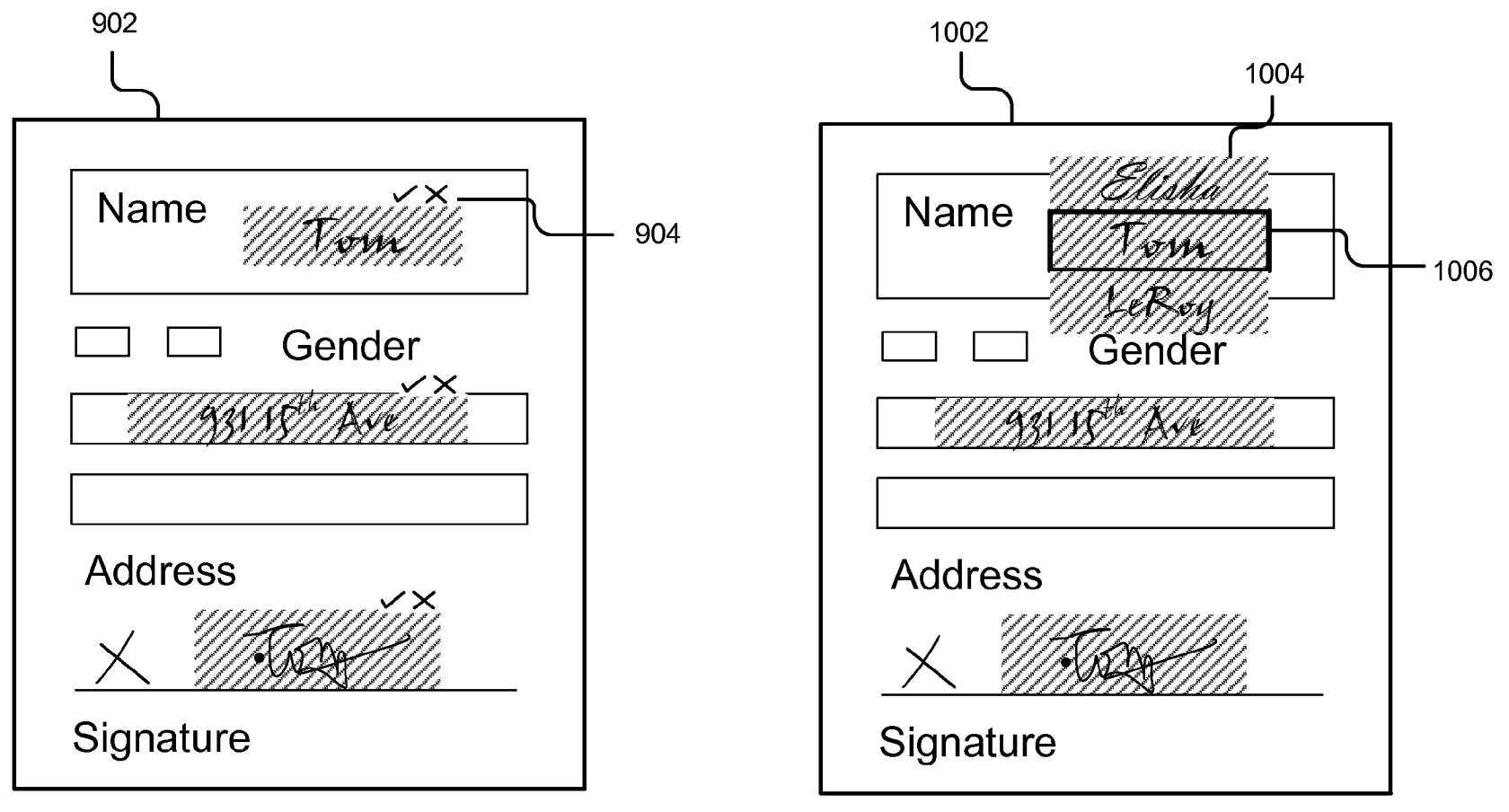

FIG. 9 is a graphic representation of an example form 902 with regions autocompleted in response to receiving a user reaction. The form 902 includes a menu 904. The menu 904 includes a tick mark and a cross mark. The autocompletion processor 210 provides autocompleted strokes that form the word "Tom" in the region associated with the "Name" field. If a user selects the tick mark to accept the strokes for "Tom," the "Name" field is automatically filled. If the user selects the cross mark to reject the strokes for "Tom," the "Name" field is not filled in and a new name will be provided in the "Name" field by the user or the autocompletion processor 210.

FIG. 10 is a graphic representation of an example form 1002 with regions autocompleted based on a ranked list of autocompleted strokes. The autocompletion processor 210 provides a drop-down menu in the region associated with the "Name" field. The drop-down menu includes a ranked list of autocompleted strokes 1004. The autocompletion processor 210 ranks the autocompleted strokes 1004 in the list based on one or more of preferring strokes on the same form, preferring strokes that have been used in previous successful completions, preferring strokes with the same field label, preferring strokes used with other autocompleted strokes, etc. A user selects strokes from the list, for example, the user selects the strokes that form "Tom" 1006 as indicated with a thick line around the word.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
loading, by a server, a form with a first form identifier (ID) for a user accessing a user device, the form being associated with a list of autocompletion targets;
retrieving, by the server, a set of regions included in the list of autocompletion targets;
identifying, by the server, a set of potential completion lists based on the first form ID and the user device, wherein each list of the set of potential completion lists includes the first form ID and potential strokes corresponding to the set of regions;
retrieving, by the server, at least one stroke from the set of potential completion lists for a region in the set of regions; and
providing the at least one stroke to the user device for presentation to the user.

2. The method of claim 1, further comprising ranking the at least one stroke based on one or more rules or user preferences including preferring strokes on the form, preferring strokes that have been used in previous successful completions, preferring strokes with a same field label and preferring strokes used with other autocompleted strokes.

3. The method of claim 1, wherein the set of potential completion lists also includes a second form ID and metadata.

4. The method of claim 3, wherein identifying the set of potential completion lists further comprises matching at least one of the set of regions and the first form ID to the second form ID and the metadata included in a potential completion list.

5. The method of claim 1, further comprising:
receiving a user reaction for the at least one stroke, the user reaction including at least one of an acceptance, a rejection and an erasure;
determining whether the user reaction is the rejection or the erasure; and
in response to determining that the user reaction is the rejection or the erasure, receiving a new stroke in the region.

6. The method of claim 1, further comprising adjusting the at least one stroke to fit in the region.

7. The method of claim 1, further comprising updating the set of potential completion lists.

8. The method of claim 1, further comprising receiving information about the user, wherein the information about the user includes at least one of a username, a global positioning system (GPS) location and a media access control (MAC) address, and wherein identifying the set of potential completion lists is based on the information about the user.

9. The method of claim 3, wherein the metadata includes metadata related to the form, metadata related to the user and other metadata.

10. A system comprising:

one or more processors;

an autocompletion processor stored on a memory and executable by the one or more processors, the autocompletion processor configured to:

load a form with a first form identifier (ID) for a user accessing a user device, the form being associated with a list of autocompletion targets;

retrieve a set of regions included in the list of autocompletion targets;

identify a set of potential completion lists based on the first form ID and the user device, wherein each list of the set of potential completion lists includes the first form ID and potential strokes corresponding to the set of regions;

retrieve at least one stroke from the set of potential completion lists for a region in the set of regions; and provide the at least one stroke to the user device for presentation to the user.

11. The system of claim 10, wherein the autocompletion processor ranks the at least one stroke based on one or more rules or user preferences including preferring strokes on the form, preferring strokes that have been used in previous successful completions, preferring strokes with a same field label and preferring strokes used with other autocompleted strokes.

12. The system of claim 10, wherein the set of potential completion lists also includes a second form ID and metadata.

13. The system of claim 12, wherein identifying the set of potential completion lists further comprises matching at least one of the set of regions and the first form ID to the second form ID and the metadata included in a potential completion list.

14. The system of claim 10, wherein the autocompletion processor:

receives a user reaction for the at least one stroke, the user reaction including at least one of an acceptance, a rejection and an erasure;

determines whether the user reaction is the rejection or the erasure; and in response to determining that the user reaction is the rejection or the erasure, receives a new stroke in the region.

15. The system of claim 10, wherein the autocompletion processor adjusts the at least one stroke to fit in the region.

16. The system of claim 10, wherein the autocompletion processor updates the set of potential completion lists.

17. A computer program product comprising a non-transitory computer useable medium including a computer readable program, wherein the computer readable program when executed on a computer causes the computer to:

load a form with a first form identifier (ID) for a user accessing a user device, the form being associated with a list of autocompletion targets;

retrieve a set of regions included in the list of autocompletion targets;

identify a set of potential completion lists based on the first form ID and the user device, wherein each list of the set of potential completion lists includes the first form ID and potential strokes corresponding to the set of regions;

retrieve at least one stroke from the set of potential completion lists for a region in the set of regions; and provide the at least one stroke to the user device for presentation to the user.

18. The computer program product of claim 17, further comprising ranking the at least one stroke based on one or more rules or user preferences including preferring strokes on the form, preferring strokes that have been used in previous successful completions, preferring strokes with a same field label and preferring strokes used with other autocompleted strokes.

19. The computer program product of claim 17, wherein the set of potential completion lists also includes a second form ID and metadata.

20. The computer program product of claim 19, wherein identifying the set of potential completion lists further comprises matching at least one of the set of regions and the first form ID to the second form ID and the metadata included in a potential completion list.

\* \* \* \* \*